United States Patent [19]

Ohkita et al.

[11] Patent Number: 5,190,697
[45] Date of Patent: Mar. 2, 1993

[54] PROCESS OF MAKING A PTC COMPOSITION BY GRAFTING METHOD USING TWO DIFFERENT CRYSTALLINE POLYMERS AND CARBON PARTICLES

[75] Inventors: Kumakazu Ohkita, Chiba; Akira Ueno, Yokohama; Toshiaki Abe; Shoichi Sugaya, both of Tokyo, all of Japan

[73] Assignee: Daito Communication Apparatus Co., Tokyo, Japan

[21] Appl. No.: 629,249

[22] Filed: Dec. 18, 1990

[30] Foreign Application Priority Data

Dec. 27, 1989 [JP] Japan .................... 1-339560

[51] Int. Cl.$^5$ .................... H01B 1/24; H01B 1/06
[52] U.S. Cl. .................... 252/511; 252/500; 252/510; 524/543; 524/544; 524/545
[58] Field of Search .................. 252/511, 510; 524/495, 524/496, 544, 545, 543

[56] References Cited

U.S. PATENT DOCUMENTS

| | | | |
|---|---|---|---|
| 4,188,276 | 2/1980 | Lyons et al. | 252/511 |
| 4,534,889 | 8/1985 | van Konynenburg et al. | 252/511 |
| 4,658,121 | 4/1987 | Horsma et al. | 252/511 |
| 4,732,701 | 3/1988 | Nishii et al. | 252/511 |
| 4,775,500 | 10/1988 | Funakoshi et al. | 252/511 |
| 4,775,778 | 10/1988 | van Konynenburg et al. | 252/511 |
| 4,818,439 | 4/1989 | Blackledge et al. | 252/511 |
| 4,880,577 | 11/1989 | Okita et al. | 252/511 |
| 4,910,389 | 3/1990 | Sherman et al. | 252/511 |

Primary Examiner—Paul Lieberman
Assistant Examiner—Bradley A. Swope
Attorney, Agent, or Firm—Morrison Law Firm

[57] ABSTRACT

A process for producing PTC (positive temperature coefficient) self-resetting overcurrent protection elements using two different crystalline polymers with an organic peroxide and carbon black. The mixture is kneaded at an elevated temperature. The two crystalline polymers include different proportions of tertiary hydrogen atoms to carbon atoms, so that the desired PTC characteristics of a highly crystallized polymer can obtain the benefit of greater proportions of tertiary hydrogen in a less highly crystallized polymer. A high degree of grafting to carbon black that increases the number of polymer having unpaired electrons in the crystalline polymer mixture through the decomposition of organic peroxide. The resulting mixture tends to disperse the carbon black uniformly throughout the resulting mixture, and to position the carbon black in a three-dimensional matrix in which it is fixed by crosslinking. The uniform distribution of the carbon black reduces localized heating and thus minimizes resistance changes following repeated overcurrent conditions. The first crystalline polymer is selected from high density polyethylene, polyesters, fluorine-containing polymers and mixtures thereof. The second crystalline polymer is either low density polyethylene or medium density polyethylene.

13 Claims, 1 Drawing Sheet

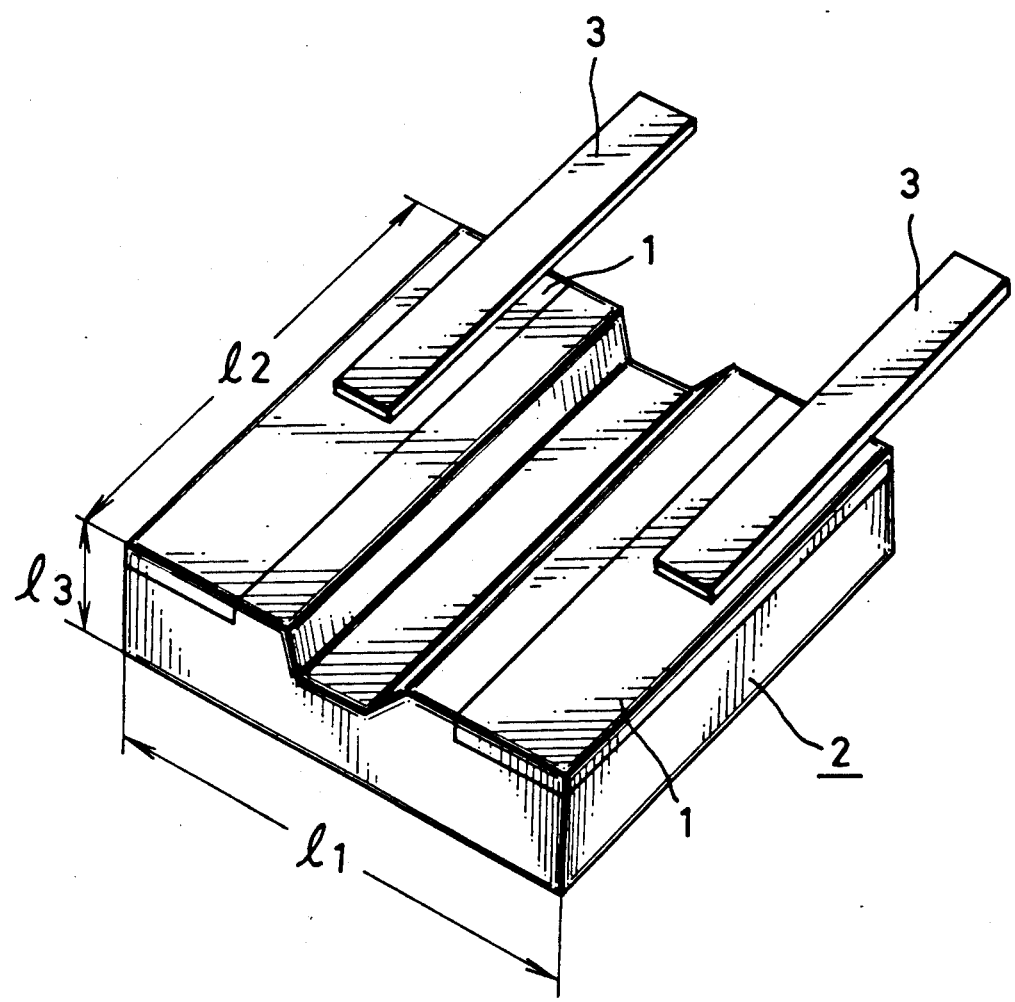

PROCESS OF MAKING A PTC COMPOSITION BY GRAFTING METHOD USING TWO DIFFERENT CRYSTALLINE POLYMERS AND CARBON PARTICLES

BACKGROUND OF THE INVENTION

1. Field of the Invention

The present invention relates to a PTC (positive temperature coefficient) composition produced by a grafting method and used as a self-resetting overcurrent protection element in electrical circuits.

2. Description of the Prior Art

PTC composition are used for self-resetting overcurrent protection elements. In the event of excessive current or voltage in a circuit an increase in the resistance of the PTC overcurrent protection element limits the current which is permitted to pass therethrough.

Such overcurrent protection elements suffer the drawback that, after being subjected to an overcurrent condition, their resistance does not return to the value it had before the overcurrent condition.

A further problem is that it is difficult to disperse conductive particles, especially carbon black, into a crystalline polymer binder. The carbon black does not enter the polymer structure as separate particles but as aggregates containing numerous particles that become distributed unevenly throughout the element. As a result, the internal resistance of the PTC composition element is non-uniform.

Consequently, power dissipation is unevenly distributed through the material, thus causing localized heating, and threatening premature failure of the element.

Japanese Patent Laid-Open No. 110702/1989 discloses an attempt to overcome problems caused by uneven distribution of particles in the element. The prior art teaches formulating a PTC composition self-resetting overcurrent protection element using a grafting method. In this method, an organic peroxide, serving as a grafting agent, is added to colloidal graphite and carbon black. The mixture is blended into high-density polyethylene. This converts a part of the high-density polyethylene having an unpaired electron to the polyethylene radical due to thermal decomposition of the organic peroxide. The aggregates of carbon black are disintegrated and dispersed into the polyethylene by grafting the polyethylene having an unpaired electron to the colloidal graphite and carbon black. The mixture is then shaped and cross-linked to stabilize the composition and give it immunity to changes in resistance value caused by repeated application of voltage.

This grafting method consists of the following sequences:

transformation of organic peroxide to the RO• radical by thermal decomposition;

generation of the polyethylene having an unpaired electron P• by removal of the tertiary hydrogen atoms located at the respective branching points of side chains of the polyethylene by RO• radical; and coupling the polyethylene having an unpaired electron P• with the phenoxy radical on the surfaces of the particles of colloidal graphite and carbon black.

This process results in the grafting of the polyethylene to the colloidal graphite and the carbon black.

Consequently, in order to graft polyethylene easily, it is preferable to have a large number of tertiary hydrogen atoms on the backbone of the polyethylene having an unpaired electron for generating polyethylene radical P•. For use in PTC composition overcurrent protection elements, a resistance/temperature characteristic whose resistance value changes radically when the temperature reaches a specified point is more desirable than one whose resistance value changes gradually with a rise in temperature. Polymers having the former characteristics are highly crystallized polymers, such as high density polyethylene. However, highly crystallized polymers lack the desired large quantity of tertiary hydrogen atoms in their main chains. For example, high density polyethylene has approximately one tertiary hydrogen atom for every 1,000 carbon atoms on the backbone of the polymer. Therefore, when a highly crystallized polymer such as, for example, a high density polyethylene is used, the ability to graft to carbon black is poor due to the small number of available polymer having unpaired electrons P•. As a result, it is difficult to disperse carbon black uniformly into the polymer. As a result of poor dispersion of the carbon black, the resistance of a PTC composition overcurrent protection elements is uneven. Localized heating during current limiting degrades the ability of the element to return to its original resistance value after repeated current limiting actions.

OBJECTS AND SUMMARY OF THE INVENTION

In order to solve the above described problem, it is an object of the present invention to formulate the PTC composition using a grafting method with a high degree of grafting to carbon black. The improvement is achieved by increasing the number of polymer having unpaired electrons in a crystalline polymer through decomposition of organic peroxide. The resulting PTC composition has a high PTC characteristics and a more uniform internal resistance. The result is a product whose resistance returns to its initial value even after repeated current limiting action.

It is a further object of the current invention to provide a method of formulating PTC elements that are more uniform in internal resistance. When used as self-resetting current limiting devices, PTC elements formulated with the method of the invention are less susceptible to changes in resistance and premature failure after a current overload.

Briefly stated, the present invention provides a process for producing PTC self-resetting overcurrent protection elements using two different crystalline polymers with an organic peroxide and carbon black. The mixture is kneaded at an elevated temperature. The two crystalline polymers include different proportions of tertiary hydrogen atoms to carbon atoms in their main chains, so that the desired PTC characteristics of a highly crystallized polymer can obtain the benefit of greater proportions of tertiary hydrogen atoms to carbon atoms on the backbone of the polymers in a less highly crystallized polymer. A high degree of grafting to carbon black that increases the number of polymer having unpaired electrons in the crystalline polymer mixture through the decomposition of organic peroxide. The resulting mixture tends to disperse the carbon black uniformly throughout the resulting mixture, and to position the carbon black in a three-dimensional matrix in which it is fixed by cross-linking. The uniform distribution of the carbon black reduces localized heating and thus minimizes resistance changes following repeated overcurrent conditions.

According to an embodiment of the invention, there is provided a method of producing a PTC composition comprising: mixing at least first and second crystalline polymers together with conductive carbon particles to produce a first mixture, the first crystalline polymer being a highly crystallized crystalline polymer, the second crystalline polymer having a number of tertiary hydrogen atoms in its main chain which is greater than a number of tertiary hydrogen atoms in the first crystalline polymer, heating the first mixture, mixing an organic peroxide into the heated first mixture to form a second mixture, the organic peroxide being effective to convert a part of the crystalline polymers having unpaired electrons in the first mixture to a polymer radical, disintegrating an aggregate body of the carbon particles by means of grafting the polymer having unpaired electrons to the carbon particles, and the grafting being effective for dispersing the disintegrated carbon particles throughout the second mixture.

The tertiary hydrogen generates the polymer having unpaired electrons by decomposition of the peroxide. Accordingly, by increasing the ratio of polymer containing a large quantity of tertiary hydrogen, the grafting ratio of polymer onto carbon black is increased.

According to a feature of the invention, there is provided a method of producing a PTC composition comprising: mixing together at least first and second crystalline polymers and conductive carbon particles to form a first mixture, the first crystalline polymer being a highly crystallized polymer, the second crystalline polymer having a number of tertiary hydrogen atoms in its main chain that is substantially greater than a number of tertiary hydrogen atoms in a main chain of the first crystalline polymer, heating the first mixture, mixing an organic peroxide into the heated first mixture to produce a second mixture, whereby at least a part of the first and second crystalline polymers in the first mixture are converted to a polymer having unpaired electrons, disintegrating an aggregate body of the carbon particles by means of grafting the polymer having unpaired electrons to the carbon particles, dispersing the disintegrated carbon particles throughout the second mixture, and decomposing the organic peroxide and the first and second crystalline polymers in the second mixture to cross-link the first and second crystalline polymers into a three-dimensional network structure.

According to a further feature of the invention, there is provided a method for producing a PTC composition comprising: mixing together a first quantity of a first crystalline polymer and a second quantity of a second crystalline polymer with a third quantity of a carbon particles to produce a first mixture, the first and second crystalline polymers having different ratios of tertiary hydrogen atoms to carbon atoms in their main chains, adding an organic peroxide to the first mixture to produce a second mixture, the organic peroxide being effective to convert at least some of the first and second polymers to a polymer having unpaired electrons, cross-linking the second mixture, and the first and second quantities being in a ratio effective to produce a resulting ratio of tertiary hydrogen atoms to carbon atoms in the cross-linked mixture that is greater than the ratio of tertiary hydrogen atoms to carbon atoms in the one of the first crystalline polymers having the lower ratio of tertiary hydrogen atoms to carbon atoms in the main chain of the polymers.

The current invention describes two methods of formulating PTC composition:

In the first method, a PTC composition is produced using a method of grafting that blends organic peroxide into a heated mixture of at least two kinds of crystalline polymers and carbon particles. The mixture transforms a part of the crystalline polymer to polymer having unpaired electrons. The carbon particles serve as conductive particles that are dispersed into the crystalline polymer by grafting the polymer having unpaired electrons to the carbon particles. The first crystalline polymer is highly crystallized. The number of the tertiary hydrogen atoms in the main chain of the second crystalline polymer is greater than in that of the first crystalline polymer.

In order to attain low resistance values in a PTC composition produced by the first grafting method, at least one of the three kinds of conductive particles i.e., carbon black, porous black, and colloidal graphite, are used as carbon particles.

The organic peroxide used in the first grafting method consists of at least one of the three kinds of peroxides: hydroperoxides, dialkylperoxides and peroxyketals.

The crystalline polymer of the PTC composition produced by the first grafting method includes at least one of the three kinds of polymers: polyethylene, polyesters and fluorine-containing polymers.

The heating temperature of the mixture used in the first grafting method is higher than the melting point of the crystalline polymers. The crystalline polymer has a melting point that is higher than any other crystalline polymer included in the mixture.

In the second method, a PTC composition is produced by a grafting method that blends organic peroxide into a heated mixture of at least two kinds of crystalline polymers and carbon particles. This serves to transform a part of the crystalline polymer to polymer having unpaired electrons. The carbon particles are dispersed into the crystalline polymer by grafting the polymer having unpaired electrons onto the carbon particles. This creates a crystalline polymer with a three-dimensional network structure. The structure is cross-linked by either the decomposition of an organic peroxide, which is not involved in the grafting process, or by irradiation. The crystalline polymer mixture consists of a first crystalline polymer, which is highly crystallized, and a second crystalline polymer. The number of tertiary hydrogen atoms in the second crystalline polymer is greater than that of the first crystalline polymer.

The carbon particles used in the second method for PTC composition by grafting consist of at least one of the three kinds of carbon particles: carbon black, porous black, and colloidal graphite.

The organic peroxide used in the second method for PTC composition consists of at least one of the three kinds of peroxides: hydroperoxides, dialkylperoxides and peroxyketals.

The first crystalline polymer used in the second method for producing a PTC composition by grafting consists of at least one of the three kinds of polymers: polyethylene, polyesters and fluorine-containing polymers.

The mechanism for grafting PTC composition using the method according to the present invention is explained hereunder:

First, when an organic peroxide, more precisely a dialkylperoxide, and for example dicumylperoxide (hereinafter abbreviated as Di-Cup), is added to a heated mixture of crystalline polymer such as, for example, polyethylene, and carbon particles used as conductive particles such as, for example, carbon black, thermal decomposition of Di-Cup occurs according to the formula below:

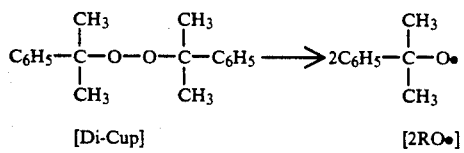

[Di-Cup]          [2RO•]

Next, removal of a part of the tertiary hydrogen atoms existing at branches of side chains of the polyethylene by RO•, causes the generation of the polyethylene radical P•, as follows:

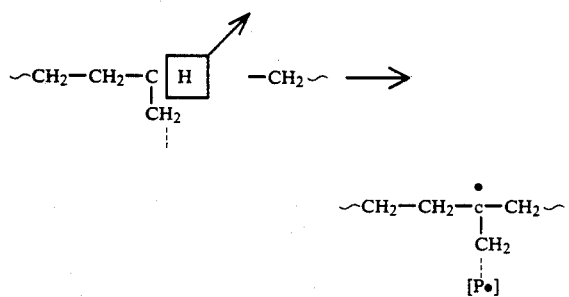

[P•]

The above formula illustrates removal of a hydrogen atom at a branching portion of the polyethylene.

Coupling of the phenoxy radical on the surface of a carbon black particle causes transformation of the RO• radical to peroxide. Peroxide generated in this manner, however, is unstable, and grafting by coupling with P.takes precedence as shown in the following formula:

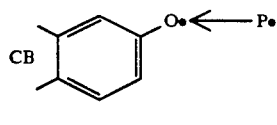

CB: carbon black

Especially in situations where carbon black is present, grafting takes precedence to the mutual cross-linking reaction of P.

As explained above, when the polyethylene having an unpaired electron is grafted onto the surface of carbon black, a part of the polyethylene is captured by the carbon black. In the process of grafting, aggregate of carbon black are disintegrated and dispersed evenly throughout the polyethylene having an unpaired electron.

According to the above reaction, as the number of tertiary hydrogen atoms in the main chain of polyethylene increases, more hydrogen atoms are removed by RO., and more polyethylene having an unpaired electron are generated. Therefore, in the absence of the second crystalline polymer, the first crystalline polymer, which is highly crystallized, has high PTC characteristics, but its degree of grafting is low because it does not have many tertiary hydrogen atoms in its main chain. However, with the addition of the second polymer, the degree of grafting is increased, since the second crystalline polymer provides many tertiary hydrogen atoms, i.e., many reaction points for grafting in its main chain, together with the first crystalline polymer.

Increasing the degree of grafting, and dispersing the carbon particles into the crystalline polymer, with the above described procedure, solves the problem of unstable resistance value in the PTC composition. Also, by giving this material a three-dimensional network structure, the carbon particles are taken into the network structure of the polymer. Consequently, the arrangement of each carbon particle in the structure is restored to its initial state on conclusion of an overcurrent condition, thus resulting in restoration of the resistance of the PTC composition to the original value.

The above, and other objects, features and advantages of the present invention will become apparent from the following description read in conjunction with the accompanying drawings, in which like reference numerals designate the same elements.

BRIEF DESCRIPTION OF THE DRAWING

The drawing shows a perspective view of an overcurrent protection element using a PTC composition produced by a grafting method according to an embodiment of the present invention.

DETAILED DESCRIPTION OF PREFERRED EMBODIMENTS

A first crystalline polymer, as used below, is highly crystallized crystalline polymer such as a high density polyethylene, polyesters and/or fluorine-containing polymers, used either singly or in a mixture of more than one thereof.

A second crystalline polymer, as used below, is one which has more tertiary hydrogen atoms than the first crystalline polymer. A low or middle density polyethylene or polypropylene may be used as the second polymer.

Taken alone, the second crystalline polymer is low in crystallization due to a large number of branched chains. Thus, the PTC characteristics of the second crystalline polymer are inferior to those of the first crystalline polymer. Therefore, balancing of the amounts of the two polymers when blending them together must be done so that the desired PTC characteristics of the first crystalline polymer are retained, while obtaining the desired result from the addition of the second polymer.

Carbon black, colloidal graphite and/or porous black is used, singly or in mixture of more than one thereof, as conductive carbon particles. Carbon black is furnace black or acetylene black. Porous black is furnace black which has been made porous by vapor etching to increase its specific surface area by at least 1.5 times.

An organic peroxide, which is used as the grafting agent, is selected from hydroperoxides, dialkylperoxides and peroxyketals. Typical examples of these three groups include 2.5-dimethylhexane-2.5-dihydroperoxide, Di-Cup, and 2.5-dimethyl-2.5-di(t-butylperoxy)hexyne-3.

The First Embodiment

A quantity of 164 g of high density polyethylene (Hizex1300J, No. of tertiary hydrogen atoms in the main chain: 1/1000 C.) as the first crystalline polymer, 36 g of low density polyethylene (Mirason9, No. of tertiary hydrogen atoms in the main chain: 20/1000 C.) as the second crystalline polymer, 100 g of carbon black (Asahi #60H) as conductive particles, 100 g of alumina (A32) as an inorganic filler, and 1 g of organic peroxide Di-Cup (PercumylD) as the grafting agent are blended and kneaded together with two rolls for 60 minutes at a constant temperature of 135° C. After grafting the polyethylene having an unpaired electron onto the surface of carbon black, the element is shaped into a PTC element 2, as shown in the figure.

A metallic leaf electrode 1 is attached to the shaped element 2 using, for example, thermal-compression bonding and radiating 30 Mrad of gamma rays to cross-link together and thus give a network structure to the polymer in element 2. As a result, element 2 is obtained with a PTC composition having dimension such as $l_1 \times l_2 \times l_3 = 9$ mm $\times 8$ mm $\times 2.5$ mm.

Chemical cross-linking is done at 200° C. to react the remaining organic peroxide, i.e., organic peroxide having not been involved in the grafting at the time of element shaping. In some cases, cross-linking may be enhanced by further heating at 180° C.

Next, terminal 3 is attached to the surface of metallic leaf electrode 1 of element 2 by, for example, spot welding. The completed element is now ready for connection to an electrical circuit for measurement of its resistance value.

The number of tertiary hydrogen atoms in the main chains of the mixture of the first and the second crystalline polymers is calculated to be approximately 4.42/1000 C.

In laboratory tests, the initial resistance value of element 2 at 20° C. was 48 ohms, but after a durability test with repeated applications of voltage, its resistance value had increased by about 30% from its initial value. The voltage application test consisted of: four two minute periods of loading with 60 VDC and a two minute pause between each cycle, three two minute periods of loading with 100 VDC and a two minute pause between each cycle, and three periods of two minutes loading with 120 VDC and a two minute pause between each cycle.

The Second Embodiment

A PTC composition element is produced according to the same procedure as that of the first embodiment except for the substitution of middle density polyethylene (Neozex2006H, No. of hydrogen atoms in the main chain thereof: 20/1000 C.) as the second crystalline polymer. A number of tertiary hydrogen atoms in the main chains in the polymer blend of the first and the second crystalline polymers is calculated to be approximately 4.42/1000 C. The initial resistance value of element 2 at 20° C. of this second embodiment was 46 ohms. The resistance increased about 40% after the same durability test as that of the first embodiment.

The Third Embodiment

An element is produced according to the same procedure as that of the first embodiment except for the substitution of low density polyethylene (UltzexUZ2020L, No. of hydrogen atoms in the main chain thereof: 15/1000 C.) as the second crystalline polymer. The number of tertiary hydrogen atoms in the main chains in the polymer blend of the first and the second crystalline polymers was approximately 3.52/1000 C.

In laboratory tests, the initial resistance value of element 2 at 20° C. of this third embodiment was 71 ohms. The resistance increased about 13% after the same durability test as that of the first embodiment.

Comparison Example

A quantity of 200 g of the same high density polyethylene as the one used for the first embodiment (Hizex1300J) was used as the first crystalline polymer. No second crystalline polymer was used. With these exceptions, an element was produced according to the same procedure as the first embodiment. The number of tertiary hydrogen atoms in the main chains of the crystalline polymer was calculated to be 1/1000 C.

The initial resistance value of the element at 20° C. of this first comparison example was 47 ohms. The resistance increased 290% after the same durability test as that of the first embodiment. Further, the respective maximum resistance values (Rp) in the resistance/temperature characteristics of the elements obtained in embodiments 1,2, and 3 and the comparison example, were all calculated to be more than 300M ohms, with their PTC characteristics according to the following formula being six digits or more, without significant differences.

$$\text{PTC characteristics} = \log (R_p/R_{20})$$

$R_{20}$: initial resistance value of the element at 20° C.

The respective amounts of ingredients, approximate numbers of tertiary hydrogen atoms in the main chains, initial resistance values of the elements, and the maximum resistance values in the resistance/temperature characteristics of embodiments 1, 2 and 3, and the comparison example are listed in the attached Table 1.

Table 1 shows that the number of tertiary hydrogen atoms existent in a polymer blend consisting of the first and second crystalline polymers is larger than that of the first crystalline polymer, by itself. Further, in the durability test using repeated applications of voltage, the rate of change of resistance value of an element produced from such polymer blend is less than that of the comparison example, in which only the first crystalline polymer is used.

The characteristics and other data of materials used for embodiments 1, 2, and 3 and the comparison example are shown in attached Table 2.

According to the present invention, by adding the second crystalline polymer having many tertiary hydrogen atoms to the highly crystallized first crystalline polymer, it is possible, without degrading the desired PTC characteristics, to increase the generation of the polymer radical and to increase the reaction points where the crystalline polymer is grafted onto the surface of carbon particles, thus enhancing grafting. As a result, the aggregation of carbon particles is separated and evenly dispersed into the crystalline polymer. Further, since the crystalline polymer, which has thus been grafted to the carbon particles, assumes a three-dimensional network structure by means of cross-linking, the carbon particles are naturally taken into the network structure.

Therefore, the arrangement of the carbon particles are restored to their initial state following repeated application of voltage, thus minimizing change in the value of resistance.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

TABLE 1

| | Amount of Ingredient (g) | | | | | | |
|---|---|---|---|---|---|---|---|
| | Crystalline polymer | | | | conductive particles carbon black (Asahi #60H) | inorganic filler alumina (A32) | grafting agent Di-Cup (percumyl D) |
| | high density polyethylene (hizex 1300J) | low density polyethylene (mirason 9) | low density polyethylene (ultzex 2020L) | middle density polyethylene (neozex 2006H) | | | |
| embodiment 1 | 164 | 36 | — | — | 100 | 100 | 1 |
| embodiment 2 | 164 | — | — | 36 | 100 | 100 | 1 |
| embodiment 3 | 164 | — | 36 | — | 100 | 100 | 1 |
| comparison example 1 | 200 | — | — | — | 100 | 100 | 1 |

| | No. of tertiary hydrogen atoms in crystalline polymer blend (per 1000 C) | electrical characteristics of element | | |
|---|---|---|---|---|
| | | initial resistance value (20° C.) (Q) | rate of resistance change from the initial value to the value after the durability test (%) | max. resistance value in resistance/temperature characteristics (MQ) |
| embodiment 1 | 4.42 | 48 | +30 | 300 or more |
| embodiment 2 | 4.42 | 46 | +40 | 300 or more |
| embodiment 3 | 3.52 | 71 | +13 | 300 or more |
| comparison example 1 | 1 | 47 | +290 | 300 or more |

TABLE 2

| category of ingredient | kind | grade name | name of maker | characteristics |
|---|---|---|---|---|
| crystalline polymer | high density polyethylene | hizex 1300J | Mitsui petro-chemical industries | No of tertiary hydrogen in main chain: 1/1000 C melting point: 131° C. |
| | low density polyethylene | mirason 9 | Mitsui petro-chemical industries | No of tertiary hydrogen in main chain: 20/1000 C melting point: 100~110° C. |
| | polyethylene | ultzex UZ2020L | Mitsui petro-chemical industries | No of tertiary hydrogen in main chain: 15/1000 C melting point: 120° C. |
| | middle density polyethylene | neozex 2006H | Mitsui petro-chemical industries | No of tertiary hydrogen in main chain: 20/1000 C melting point: 120~125° C. |
| conductive particle | carbon black | Asahi #60H | Asahi carbon | oil absorption: 1.24 ml/g |
| inorganic filler | alumina | A32 | Nippon light metal | particle diameter: 1 μm |
| grafting agent | Di-Cup | percumyl D | Nippon oil fats | half life: 1 min./171° C. |

What is claimed is:

1. A method of producing a PTC (positive temperature coefficient) composition comprising:
   mixing at least a first and a second crystalline polymer together with conductive carbon particles to produce a first mixture of polymers having a number of tertiary hydrogen atoms greater than 3.5 per 1000° C. on the average;
   said first crystalline polymer being a highly crystallized crystalline polymer selected from the group consisting of high density polyethylene, polyesters, fluorine-containing polymers, and mixtures thereof, the amount of said first crystalline polymer being sufficient to impart PTC properties of self-resetting and overcurrent protection to said composition;
   said second crystalline polymer being selected from the group consisting of low density polyethylene and medium density polyethylene, said second crystalline polymer being present in an amount to provide sufficient tertiary hydrogen atoms so that the composition can graft to said carbon particles and thus disperse said carbon particles throughout said composition;
   heating said first mixture;
   mixing an organic peroxide into the heated first mixture to form a second mixture;
   said organic peroxide being present in sufficient amount and being effective to convert a part of said polymer in said first mixture to a polymer having unpaired electrons;
   disintegrating an aggregate of said carbon particles by means of grafting said polymer having unpaired electrons to said carbon particles; and
   said grafting being effective for dispersing said disintegrated carbon particles throughout said second mixture.

2. A method of producing a PTC composition according to claim 1 wherein:
   said carbon particles are selected from the group consisting of at least one of carbon black, porous black and colloidal graphite.

3. A method of producing a PTC composition according to claim 1 wherein:
   said organic peroxide is selected from the group consisting of hydroperoxides, dialkylperoxides peroxyketals, and mixtures thereof.

4. The method of claim 1 wherein:
   said second crystalline polymer has a number of tertiary hydrogen atoms greater than 15 per 1000° C.

5. A method of producing a PTC composition according to claim 1 wherein:
   a heating temperature of said first mixture is higher than a melting point of said first crystalline polymer whose melting point is higher than any other crystalline polymer(s) included in said first mixture.

6. A method of producing a PTC composition comprising:
   mixing together at least a first and a second crystalline polymer and conductive carbon black particles to form a first mixture of polymers having a number of tertiary hydrogen atoms greater than 3.5 per 1000° C. on the average;

said first crystalline polymer being a highly crystallized polymer selected from the group consisting of high density polyethylene, polyesters, fluorine-containing polymers, and mixtures thereof, the amount of said first crystalline polymer being sufficient to impart PTC properties of self-resetting and overcurrent protection to said composition;

said second crystalline polymer being selected from the group consisting of low density polyethylene and medium density polyethylene, said second crystalline polymer being present in an amount to provide sufficient tertiary hydrogen atoms so that the composition can graft to said carbon particles and thus disperse said carbon particles throughout said composition;

heating said first mixture;

mixing an organic peroxide into the heated first mixture to produce a second mixture, said organic peroxide being present in sufficient amount to convert at least a part of said first and second crystalline polymers in said first mixture to a polymer having unpaired electrons;

disintegrating an aggregate of said carbon particles by means of grafting said polymer having unpaired electrons to said carbon particles;

dispersing said disintegrated carbon particles throughout said second mixture; and decomposing said organic peroxide and said first and second crystalline polymers in said second mixture to cross-link said first and second crystalline polymers into a three dimensional network structure.

7. A method of producing a PTC composition according to claim 6 wherein:
said carbon particles are selected from the group consisting of carbon black, porous black colloidal graphite, and mixtures thereof.

8. A method of producing a PTC composition according to claim 6 wherein:
said organic peroxide is selected from the group consisting of hydroperoxides, dialkylperoxides peroxyketals, and mixtures thereof.

9. The method of claim 6 wherein:
said second crystalline polymer has a number of tertiary hydrogen atoms greater than 15 per 1000° C.

10. A method of producing a PTC composition according to claim 6 wherein:
the step of heating said first mixture is performed at a temperature which is higher than a melting point of any crystalline polymer in said first mixture.

11. A method for producing a PTC composition comprising:
mixing together a first quantity of a first crystalline polymer and a second quantity of a second crystalline polymer with a third quantity of carbon particles to produce a first mixture of polymers having a number of tertiary hydrogen atoms greater than 3.5 per 1000° C. on the average;

said first and second crystalline polymers having a different ratio of tertiary hydrogen atoms to carbon atoms in their main chains;

said first crystalline polymer being a highly crystallized crystalline polymer selected from the group consisting of high density polyethylene, polyesters, fluorine-containing polymers, and mixtures thereof, the amount of said first crystalline polymer being sufficient to impart PTC properties of self-resetting and overcurrent protection to said composition;

said second crystalline polymer being selected form the group consisting of low density polyethylene and medium density polyethylene, said second crystalline polymer being present in an amount to provide sufficient tertiary hydrogen atoms so that the composition can graft to said carbon particles and thus disperse said carbon particles throughout said composition;

adding an organic peroxide to said first mixture to produce a second mixture;

said organic peroxide being present in sufficient amount and being effective to convert at least some of said first and second polymers to a polymer having unpaired electrons;

cross-linking said second mixture; and said first and second quantities being in a ratio effective to produce a resulting ratio of tertiary hydrogen atoms to carbon atoms in the cross-linked mixture that is greater than the ratio of tertiary hydrogen atoms to carbon atoms in the one of said first crystalline polymers having the lower ratio of tertiary hydrogen atoms to carbon atoms in the main chain of the polymers.

12. The method of claim 11 wherein:
said second crystalline polymer has a number of tertiary hydrogen atoms greater than 15 per 1000° C.

13. A method of producing a PTC (positive temperature coefficient) comprising:
mixing at least a first and a second crystalline polymer together with conductive carbon particles to produce a first mixture of polymers having a number of tertiary hydrogen atoms greater than 3.5 per 1000° C. on the average;

said first crystalline polymer being a high density polyethylene, the amount of said first crystalline polymer being sufficient to impart PTC properties of self-resetting and overcurrent protection to said composition;

said second crystalline polymer is selected from the group consisting of low density and medium density polyethylene, said second crystalline polymer being present in an amount effective to provide sufficient tertiary hydrogen atoms so that the composition can graft to said carbon particles and thus disperse said carbon particles throughout said composition;

said first crystalline polymer and said second crystalline polymer are present in a ratio of about 4:1;

heating said first mixture at a nominal temperature of 135° C.;

mixing dicumyl peroxide into the heated first mixture to form a second mixture;

said dicumyl peroxide being present in sufficient amount effective to convert a part of said polymer in said first mixture to a polymer having unpaired electrons;

disintegrating an aggregate of said carbon particles by means of grafting said polymer having unpaired electrons to said carbon particles; and said grafting being effective for dispersing said disintegrated carbon particles throughout said second mixture.

* * * * *